United States Patent [19]

Doniat et al.

[11] 4,217,191

[45] Aug. 12, 1980

[54] PROCESS FOR REGENERATING CONTAMINATED ACTIVATED CARBON

[75] Inventors: Denis Doniat, Paris, France; Jean-Michel Corajoud, Lausanne, Switzerland; Jacques Mosetti, Grand-Lancy-Geneva, Switzerland; Augusto Porta, Geneva, Switzerland

[73] Assignee: Battelle Memorial Institute, Geneva, Switzerland

[21] Appl. No.: 882,083

[22] Filed: Mar. 1, 1978

Related U.S. Application Data

[63] Continuation of Ser. No. 733,324, Oct. 18, 1976, abandoned, which is a continuation-in-part of Ser. No. 679,934, Apr. 26, 1976, abandoned, which is a continuation of Ser. No. 405,423, Oct. 11, 1973, abandoned.

[30] Foreign Application Priority Data

Oct. 12, 1972 [CH] Switzerland ............... 14734/72

[51] Int. Cl.$^2$ ................................ C25F 1/00
[52] U.S. Cl. .................... 204/130; 204/149; 204/151; 204/222
[58] Field of Search ............... 204/130, 129, 149, 151, 204/222

[56] References Cited

U.S. PATENT DOCUMENTS

| | | | |
|---|---|---|---|
| 943,188 | 12/1909 | Hartman | 204/149 |
| 2,925,371 | 2/1960 | van Winkel et al. | 204/222 |
| 3,824,163 | 7/1974 | Maget | 204/130 |
| 3,914,164 | 10/1975 | Clark | 204/149 |

Primary Examiner—R. L. Andrews
Attorney, Agent, or Firm—Robert E. Burns; Emmanuel J. Lobato; Bruce L. Adams

[57] ABSTRACT

Process for regenerating activated carbon particles contaminated by oxidizable impurities. An electrolysis cell is divided by a liquid-permeable membrane to define an anodic chamber and a cathode chamber therein both filled in operation with an electrolyte. Recycling conduits communicate with the anode chamber and a recirculating pump to establish a fluid circuit therewith. A suspension of particles of activated carbon contaminated by oxidizable impurities suspended in an aqueous solution of an electrolyte is loaded into the fluid circuit and circulated therethrough. A voltage applied to the electrodes of the electrolysis cell develops an electrolysis reaction in the aqueous solution of the electrolyte and atomic oxygen is liberated at the surface of the anode electrode. As particles of the activated carbon flow through the anode cell they contact the anode electrode and atomic oxygen is liberated at their surfaces which oxidizes impurities adsorbed by the particles. After the carbon particles have been circulated for a sufficient time to oxidize all of the impurities thereon, the regenerated particles of activated carbon and the aqueous solution of the electrolyte are discharged from the recirculating circuit.

2 Claims, 2 Drawing Figures

PROCESS FOR REGENERATING CONTAMINATED ACTIVATED CARBON

This is a continuation, of application Ser. No. 733,324, filed Oct. 18, 1976 abandoned which is a continuation-in-part application of application Ser. No. 679,934 filed Apr. 26, 1976 and now abandoned and which was a continuation application of application Ser. No. 405,423 filed Oct. 11, 1973 and now abandoned.

BACKGROUND OF THE INVENTION

This invention relates generally to water purification and more particularly to a new and improved regeneration treatment for activated carbon.

The use of activated carbon for the purification of drinking water or the tertiary treatment of waste waters is well known. Water purification processes using activated carbon have proven effective for industrial wastes, particularly those containing organic matter that is not easily biodegraded, and for household waste water.

Water purification processes using activated carbon have several characteristics that make them attractive including the ability to handle sudden surges of load or concentration of organic materials in the waste waters being treated, applicability to a large range of industrial effluxes, and low capital investment. However, for processes using activated carbon to be economically feasible, after the carbon has been saturated, some means of regenerating it must be employed to render it suitable for reuse.

Various methods of regenerating activated carbon have been proposed and implemented. These generally employ thermal, chemical, or biological processes for effecting regeneration of the carbon. All of these treatments are expensive and set a limit on how economically adsorption purification processes can be run. For instance, thermal treatments, which are presently the most commonly used methods for regenerating activated carbon, are characterized by large losses of activated carbon.

For this reason the use of activated carbon has generally been limited up to now to purifying drinking water or to the purification of household waste water.

SUMMARY OF THE INVENTION

It is a principal object of the present invention to provide a new and improved process for regenerating activated carbon that has been used in purifying industrial and household waste waters and is to be reused in treatment of waste waters.

Another object is to provide a process for regenerating activated carbon particles contaminated by at least one oxidizable impurity or contaminant.

In accordance with the invention particles of activated carbon to be regenerated after their use in purification of industrial or household waste waters are suspended in an electrolyte. The resulting mixture is circulated through an electrolytic cell provided with a membrane or liquid-permeable partition defining two chambers in the interior of the cell and disposed to separate the cell into an anode chamber and a cathode chamber. The carbon-electrolyte mixture circulates through the anode chamber, and the fluid-permeable partition prevents carbon particles from entering the chamber containing the cathode but allows the electrolyte to flow therethrough.

A DC voltage source is connected to the cell to enable electrolysis to occur with the attendant liberation of oxygen at the anode of the cell. Carbon particles contact the anode as they flow through the anode chamber, and while in contact with the anode, oxygen is liberated at their surface. This oxygen reacts with adsorbed impurities on the surface of the carbon particles to oxidize the impurities.

The cell is provided with means for inducing turbulence in the carbon-electrolyte mixture to aid mixing of the carbon with the electrolyte and to help insure that all the carbon particles contact the anode. A fluid circuit comprising a conduit and a pump receives the carbon-electrolyte mixture as it flows through an outlet of the anode chamber and recirculates the mixture back through an inlet in the anode chamber. The fluid circuit is provided with means for loading contaminated activated carbon and electrolyte and means for discharging reactivated or regenerated activated carbon and electrolyte.

BRIEF DESCRIPTION OF THE DRAWINGS

Other features and advantages of the process for regenerating activated carbon and apparatus for use therewith in accordance with the present invention will be better understood as described in the following specification and appended claims, in conjunction with FIG. 1 of the accompanying drawings, which is a view of apparatus partially in section for regenerating activated carbon in accordance with the present invention.

DESCRIPTION OF THE PREFERRED EMBODIMENT

Figure 1:
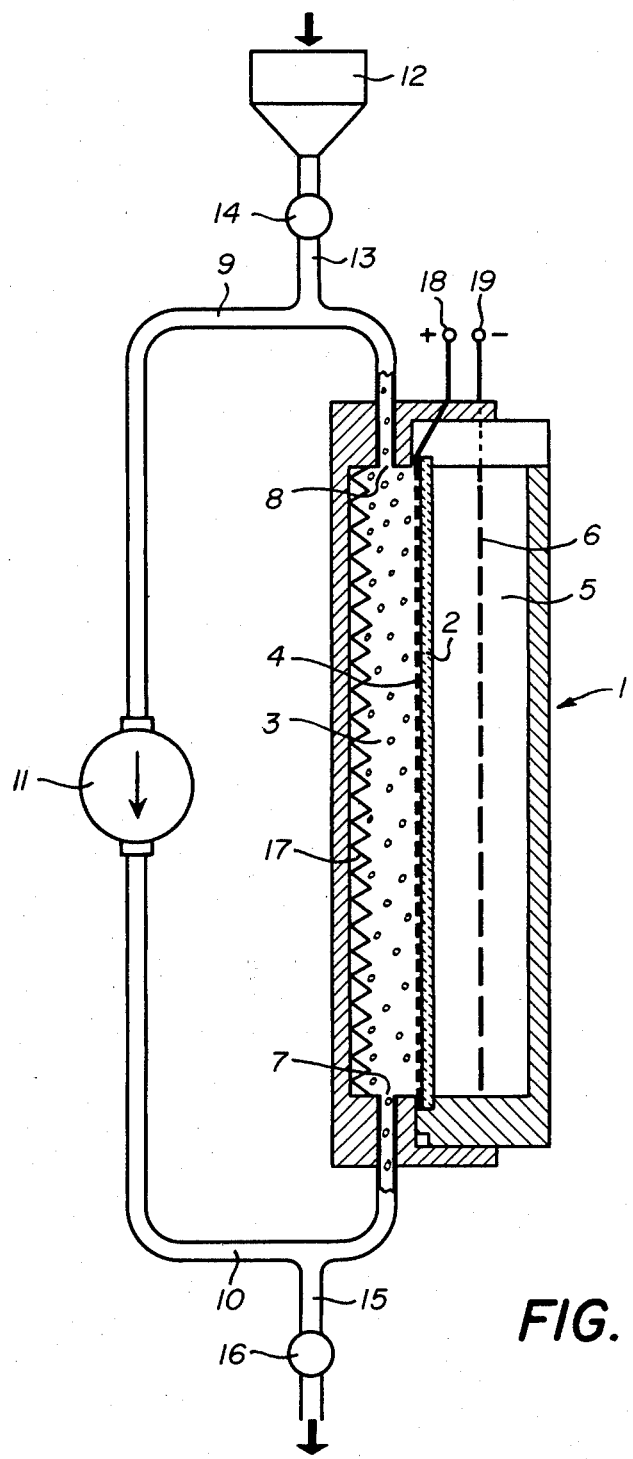

In accordance with the invention, an electrolytic or electrolysis cell 1 is divided by a liquid-permeable membrane defining a partition 2, into an anode chamber 3 which contains an electrolyte and activated carbon particles to be reactivated and a cathode chamber 5 which contains only electrolyte.

A current collector or perforated plate anode 4 is mounted inside the anode chamber 3 next to the liquid-permeable partition 2 and is constructed with a multiplicity of holes to provide communication between the anode chamber 3 and the permeable partition 2. A cathode 6 is disposed in the cathode chamber 5 and both the anode 4 and the cathode 6 are electrically connected to external power terminals 18 and 19 respectively.

The anode chamber 3 is provided with an inlet 7 and an outlet 8 connected to recycling conduits 9 and 10 respectively which are in turn connected to a recirculating pump 11. The combination of conduits 9 and 10 and pump 11 establish a fluid circuit through which an electrolyte and carbon suspension circulates during the regeneration process. The contaminated carbon in particulate form and electrolyte are loaded into the apparatus through a hopper 12 in communication with conduit 9 through a feed or supply tube or conduit 13. An adjustable valve 14 is provided in the feed conduit to control communication between the hopper 12 and the inlet or supply conduit 9. A discharge tube or pipe 15 is connected to the circulating conduit 10 to make possible the discharge of the electrolyte-carbon suspension in the fluid circuit after activation of the carbon and is provided with an adjustable valve 16 to control the discharge of the suspension.

In operation the recirculating pump 11 pumps the carbon-electrolyte suspension through conduit 10, through the inlet 7, through the anodic chamber 3 and out the outlet 8. The suspension returns to the pump 11 via conduit 9. The action of pump 11 aids in the mixing of the carbon and the electrolyte. Additionally baffles 17, disposed on an inner surface of anode chamber 3, induce turbulence as the carbon-electrolyte suspension flows through the anodic chamber 3, which further aids mixing of the carbon in the electrolyte, and enhances the contact of the carbon particles with the anode as later explained.

Power terminals 18 and 19 are connected to a direct current voltage source so that the anode 4 is positive with respect to the cathode 6. As the carbon-electrolyte suspension flows through the anode chamber 3 particles of carbon contact the anode 4. During the time a particle of carbon is in contact with the anode 4 electrically, it can be considered an extension thereof. The voltage difference between the anode 4 and the cathode 6 causes electrolysis to take place, and oxygen to be liberated at the surface of the anode 4 and at the surfaces of the carbon particles in contact with the anode 4.

The anode reaction produces extremely active atomic oxygen which oxidizes organic impurities adsorbed by the carbon. The effectiveness of the oxidization reaction is enhanced because the oxygen is formed on the surface of the carbon particles where the impurities are concentrated.

Regenerating the activated carbon in a particulate form dispersed through an electrolyte is an important feature of the present invention. This technique eliminates the cost and problems associated with manufacturing conventional solid carbon electrodes, it increases the electrolyte-carbon interface thus increasing the effective active surface of the electrode, it allows the development of high current densities with low polarization at the electrolyte-carbon interface, it reduces energy losses due to establishement of nonuniform electric fields in the mass of the electrode, and it results in an improvement in the kinetics of the mass transport process and facilitates loading and removal or carbon from the regenerative apparatus.

An apparatus for regenerating activated carbon according to the present invention may be built having a liquid-permeable partition made of a material inert under the conditions of the oxidization reaction; for example polyvinylchloride or polypropylene. The anode electrode should be made of a material resistant to oxidation in the electrolyte. Both lead and platinized titanium are effective as materials for the anode electrode. The anode electrode should be constructed to provide a large area in contact with the carbon-electrolyte suspension. An anode electrode made of elements ten centimeters by five centimeters and spaced 0.7 to 0.8 millimeters has proved satisfactory. The material used for the cathode is not critical but should preferably be chosen to have a low hydrogen overvoltage to reduce energy consumption. Both nickel and platinum are satisfactory for the cathode. An electrolyte of sodium sulfate ($Na_2SO_4$) in aqueous solution may be used. Sodium sulfate has the desirable characteristic that it does not evolve gaseous by-products during electrolysis, however other electrolytes can be substituted thereof.

In operation the cell voltage may be in the oder of one to ten volts at current densities in the order of ten to one thousand milliamperes per square centimeter of anode 4 area. The cell voltage is preferably a D.C. voltage, however a low frequency A.C. voltage will also produce oxygen by electrolysis.

The minimum cell voltage applied across the electrodes to provide electrolysis should evidently be sufficiant to overcome the water decomposition voltage, overvoltage at the electrodes and ohmic loss in the interelectrode gap.

TEST No. 1

In order to test the effectiveness of the present invention activated carbon was contaminated with phenol by preparing a mixture of phenol at a concentration of ten grams per liter with powdered activated carbon at a concentration of thirty grams per liter. The carbon was allowed to remain in the mixture for four hours. The contaminated carbon was recovered from the mixture by filtration, placed in suspension in an aqueous solution of sodium sulfate, and subjected to regeneration in an electrolysis cell as described hereinabove. For this test the concentration of the sodium sulfate solution was about five grams per liter, the cell voltage was about five volts and the cell drew about four to five amperes of current. A regeneration cycle lasted about between four to sixteen hours for carbon concentrations between about twenty to one hundred twenty grams per liter of electrolyte.

The initial adsorption capacity of the carbon corresponded to about 0.53 grams of chemical oxygen demande (COD) per gram of activated carbon. At the end of three adsorption and regeneration cycles the adsorption capacity of the carbon was found to stabilize at between about 0.18 to 0.20 grams of chemical oxygen demande per gram of activated carbon. The adsorption capacity of the activated carbon remained at about this level at the end of eight adsorption and regeneration cycles.

TEST No. 2

In another test settled household waste water containing organic waste material was purified by being treated with activated carbon for about fourteen hours. The initial chemical oxygen demand of the water corresponded to about 0.64 grams COD per liter of water.

The contaminated carbon was then removed from the waste water and regenerated according to the process described herein above. The initial adsorption capacity of the carbon was about 0.56 grams of chemical oxygen demand (COD) per gram of activated carbon and after one regeneration cycle was measured to be about 0.52 grams of chemical oxygen demand per gram of activated carbon. The measured value of the chemical oxagen demand of the regeneration solution was 3.6 milligrams COD per liter or about one hundredth of the chemical oxygen demand eliminated by adsorption. Thus about 99% of the organic material adsorbed by the carbon was oxidized by the regeneration process.

TEST No. 3

Two additional test series were carried out on activated carbon contaminated by pollutants adsorbed from primary domestic effluents in a municipal water treatment basin, in order to further test the effectiveness of regenerating activated carbon by electrolysis with circulation of a carbon-electrolyte suspension in accordance with the present invention.

The said primary domestic effluents, from which pollutants were adsorbed on the particulate carbon subsequently subjected to regeneration, had a measured average chemical oxygen demand which ranged between 70–100 milligrams C O D per liter of the effluent.

However, it may be noted that both the nature and the concentration of the pollutants present in the said primary effluents were unknown, and may moreover be presumed to vary notably from one test to the other.

These test series were carried out with commercially available granular activated carbon of the type having the trade name P-3B PAMCO, manufactured by Pacific Metals Co. This carbon is obtained from palm kernel shells and has a grain size corresponding to 12–32 mesh, a specific surface of 920 $m^2$/gram and a density of 0.52 grams/$cm^2$.

Each of the test series comprised 6 adsorption/regeneration cycles using 750 grams of the activated carbon mentioned above.

Figure 2:
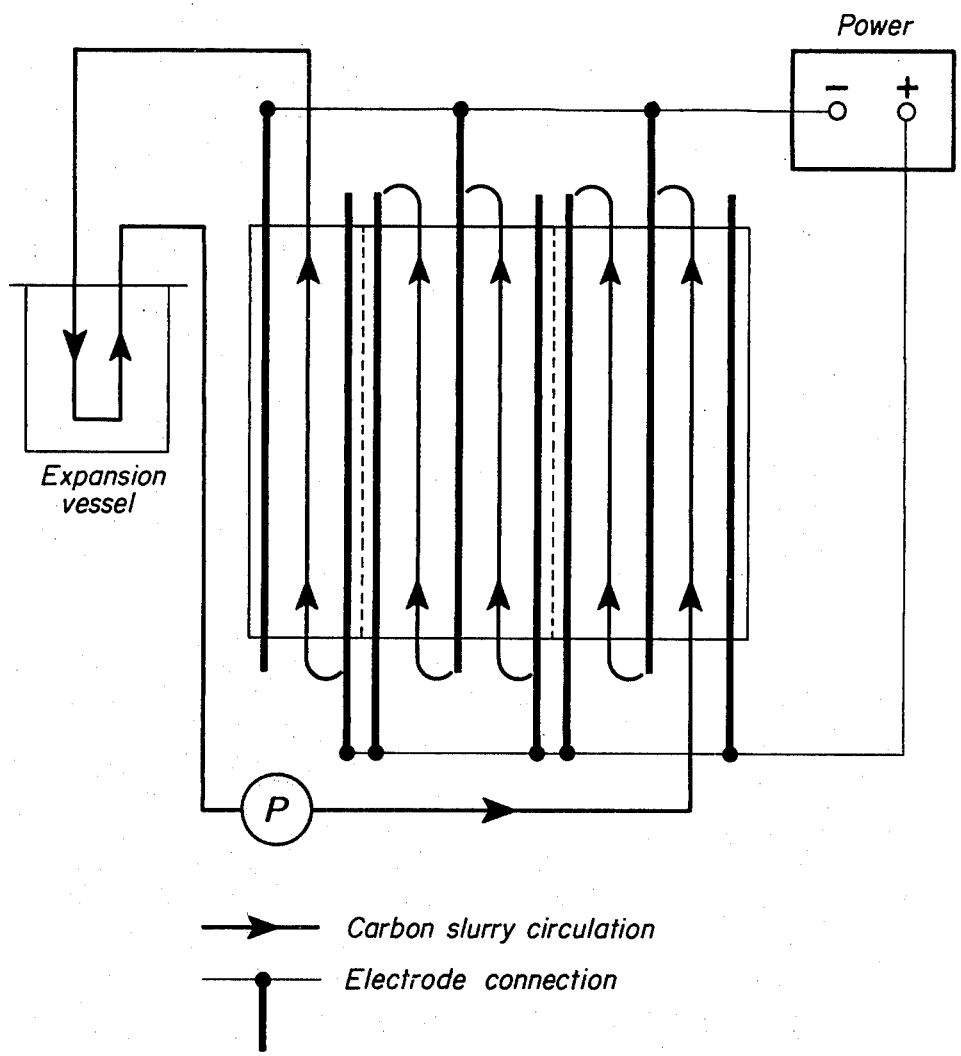
FIG. 2 of the drawings shows a diagram of a test arrangement including several electrolysis cells.

Electrochemical regeneration of the contaminated carbon was carried out in an apparatus which comprised five electrolysis cells electrically connected in parallel and hydraulically connected in series with a circulating pump P and an expansion vessel EV, as is shown diagrammatically in FIG. 2 of the accompanying drawings, so as to provide a closed loop path for recirculating a carbon-electrolyte suspension through the cells during regeneration of the carbon.

The electrolysis cells of the said apparatus used for regeneration were equipped with lead anodes and steel cathodes spaced apart at a distance of 6 mm. from each other.

The electrolyte used to carry out the regeneration phase of the said cycles of the test series was an aquous solution of $Na_2SO_4$ with a concentration of 5 grams/liter.

Regeneration was carried out by closed-loop recirculation of the contaminated carbon in suspension in the said electrolyte by means of the apparatus diagrammatically shown in FIG. 2, while applying a cell voltage lying between 5 and 7 volts (as appears from the last column 1 of the tables given below) so as to achieve electrolysis in the five cells, the current density being kept substantially constant at 3 A/$dm^2$. It is understood, however, that lower cell voltages and current densities may be used to achieve electrolysis with a lower consumption of energy.

The carbon-electrolyte suspension subjected to recirculation through the cells contained 50 grams of contaminated carbon per liter of the said electrolyte during regeneration of the carbon used in a first series, which provided the results given in Table I below. In the second test series, regeneration was carried out with recirculation of a suspension containing 75 grams of carbon per liter, and the regenerated carbon provided the results given in Table II below.

These Tables I and II first give the results of adsorption treatments which were respectively carried out with fresh carbon (columns C and D) and with regenerated carbon (columns E to H) obtained after each of the six successive adsorption/regeneration cycles of the said test series. The order of these cycles, is given in the first column of these Tables, cycle No. 1 corresponding to the first regeneration, No. 2 to the second regeneration etc.

The columns B to H of the tables below may moreover be explained as follows:

Column B gives the initial measured chemical oxygen demand of the primary effluent ($COD_o$ in milligr. COD per liter of effluent) before treatment thereof with carbon.

Columns C and E give the final measured oxygen demand of the effluent after treatment ($COD_l$ in milligr. COD per liter) on one hand with fresh carbon (Col. C, $COD_{l\,tfc}$) and on the other hand with regenerated carbon (Col. E, $COD_{l\,trc}$) for four hours.

Columns D and G respectively give the calculated adsorption capacity of the fresh carbon and of the regenerated carbon (Col. D: A. cap.$_{fc.}$ and Col. G: A. cap.$_{r.c.}$ in milligr. COD adsorbed per gram of carbon).

Column F gives the calculated percentage of the COD eliminated from the effluent by adsorption on the regenerated carbon in each cycle, i.e. $COD_{elim.}$ (%) = 100 ($COD_o$–$COD_{l\,trc}$)/$COD_o$.

Column H gives the calculated regeneration efficiency $\eta$(%) of the regeneration in each cycle, i.e. $\eta$(%) = 100 A.cap.$_{r.c.}$/A.cap.$_{f.c.}$.

Finally, as already mentioned, Col. 1 gives the cell voltage V which was applied during the regeneration phase of the six successive cycles in each test series.

TABLE I

| CYCLE | PRIMARY EFFLUENT | ADSORPTION ON FRESH CARBON | | ADSORPTION ON REGENERATED CARBON | | | | CELL VOLTAGE |
|---|---|---|---|---|---|---|---|---|
| A | B | C | D | E | F | G | H | I |
| No | $COD_o$ mgr/l | $COD_{ltfc}$ mgr/l | Acap$_{fc}$ mgr/gr | $COD_{ltrc}$ mgr/l | $COD_{elim.}$ % | Acap$_{rc}$ mgr/gr | $\eta$ % | V volts |
| 1 | 75 | 48 | 54 | 52 | 30 | 46 | 85 | 6 |
| 2 | 65 | 40 | 50 | 44 | 32 | 42 | 84 | 6,2 |
| 3 | 60 | 41 | 38 | 46 | 23 | 28 | 74 | 5,9 |
| 4 | 61 | 43 | 36 | 45 | 26 | 32 | 89 | 6,1 |
| 5 | 82 | 62 | 40 | 65 | 20 | 34 | 85 | 7 |
| 6 | 85 | 65 | 40 | 68 | 20 | 34 | 85 | 7,2 |

TABLE II

| CYCLE | PRIMARY EFFLUENT | ADSORPTION ON FRESH CARBON | | ADSORPTION ON REGENERATED CARBON | | | | CELL VOLTAGE |
|---|---|---|---|---|---|---|---|---|
| A | B | C | D | E | F | G | H | I |
| No | $COD_o$ mgr/l | $COD_{ltfc}$ mgr/l | Acap$_{fc}$ mgr/gr | $COD_{ltrc}$ mgr/l | $COD_{elim.}$ % | Acap$_{rc}$ mgr/gr | $\eta$ % | V volts |
| 1 | 75 | 48 | 54 | 61 | 18 | 40 | 74 | 6,2 |
| 2 | 65 | 40 | 50 | 46 | 30 | 38 | 76 | 7,2 |

TABLE II-continued

| CYCLE | PRIMARY EFFLUENT | ADSORPTION ON FRESH CARBON | | ADSORPTION ON REGENERATED CARBON | | | | CELL VOLTAGE |
| --- | --- | --- | --- | --- | --- | --- | --- | --- |
| A | B | C | D | E | F | G | H | I |
| No | $COD_o$ mgr/l | $COD_{ltfc}$ mgr/l | $Acap_{fc}$ mgr/gr | $COD_{ltre}$ mgr/l | $COD_{elim.}$ % | $Acap_{rc}$ mgr/gr | $\eta$ % | V volts |
| 3 | 60 | 41 | 38 | 45 | 25 | 30 | 79 | 6,1 |
| 4 | 61 | 43 | 36 | 47 | 23 | 28 | 77 | 6,5 |
| 5 | 82 | 62 | 40 | 67 | 18 | 30 | 75 | 6,7 |
| 6 | 85 | 65 | 40 | 68 | 20 | 34 | 85 | 7,3 |

As appears from the foregoing, with particular reference to the test results given in Tables I and II above, a high regeneration efficiency of about 75–85% can be repeatedly achieved in successive adsorption/regeneration cycles. The efficiency of this regeneration is moreover substantially independent of the nature and amount of the adsorbed pollutants, as well as other process parameters, so long as the applied cell voltage is sufficient to decompose water by electrolysis and the carbon-electrolyte suspension is recirculated through the cell for a sufficient time to achieve substantially complete regeneration.

It may moreover be mentioned that such regeneration was repeatedly achieved with only a negligible loss (less than 1% per cycle) of activated carbon during the adsorption/regeneration cycles of the test runs described above with reference to Tables I and II.

It may thus be seen that due to the simple combination of recirculating the carbon-electrolyte suspension with generation of atomic oxygen on the carbon particles, the process according to the present invention is quite insensitive to variations in the process parameters and hence requires no precise control thereof. This process may thus be effectivily carried out over a broad range of process parameters but nevertheless allows a high regeneration of efficiency to be achieved with substantially complete removal of quite different adsorbed organic contaminants, whatever their nature or amount may be.

The simple combination of recirculating the carbon-electrolyte suspension with simultaneous electrolytic decomposition of the water thus allows the process according to the present invention to be readily carried out continuously on an industrial scale.

This process moreover allows a high regeneration efficiency to be achieved in all cases by means of a very simple electrolysis cell arrangement which is equipped with a simple recirculating system for the said suspension, but does not require any special control means for adapting the process parameters to the adsorbed materials to be eliminated by oxidation in each case.

The present invention thus effectively meets the technical requirements of a continuous industrial regenerating process capable of eliminating a broad range of oxidizable organic and inorganic pollutants from particulate activated carbon previously used to adsorb these pollutants from domestic or industrial waste waters.

What we claim and desire to secure by Letters Patent is:

1. An electrochemical regeneration process for eliminating oxidizable adsorbed waste-water pollutants from particulate active carbon contaminated through previous use thereof to purify any industrial or domestic waste-waters, comprising the step of flowing an agitated aqueous slurry of contaminated carbon particles as a slurry electrode through an electrochemical cell so as to repeatedly impinge said particles on a fixed positive collector and to thereby subject the pollutants adsorbed on said particles to oxidation in said cell, wherein said process comprises:
   (a) anodically generating atomic oxygen on the positive collector by applying across said cell a voltage sufficient to decompose water by electrolysis in said slurry;
   (b) continuously recirculating a slurry of carbon particles contaminated with said adsorbed waste-water pollutants through the electrochemical cell along a closed-loop circuit wherein said contaminated carbon particles in suspension in the slurry leaving said cell are continually recycled directly back to the cell so that said water-pollutants adsorbed thereon are subjected to continually sustained gradual oxidation by means of the atomic oxygen anodically generated by electrolysis while said contaminated carbon particles undergo continually repeated successive passages through the cell due to direct recycling thereof back to said cell;
   (c) continuously recirculating said slurry along said closed-loop circuit and recycling said slurry directly back to said cell for a sufficient period of time to allow substantially complete decomposition of said adsorbed waste-water pollutants due to said continually sustained gradual oxidation thereof by means of said atomic oxygen anodically generated by electrolysis, and to thereby substantially eliminate all of said adsorbed waste-water pollutants by oxidative decomposition during said continually repeated successive passages through said cell.

2. A process of electrochemically regenerating particulate active carbon contaminated by adsorbed undetermined oxidizable waste-water pollutants, comprising the steps of:
   (a) continuously recirculating an aqueous slurry of the contaminated particulate active carbon through an electrochemical cell having a fixed positive collector and means within the cell for inducing turbulence within the slurry to repeatedly contact the particulate active carbon against the positive collector of the electrochemical cell, the step of continuously recirculating consisting essentially of repeatedly flowing the slurry through the cell and re-introducing the slurry directly back into the cell without exposing the particulate active carbon to pollutants;
   (b) generating atomic oxygen on the positive collector of the cell and on the particulate active carbon of the slurry contacting the positive collector by applying across the cell a voltage sufficient to decompose by electrolysis the water in the slurry while the slurry is being continuously recirculated through the cell; and
   (c) carrying out steps (a) and (b) until substantially all of the adsorbed waste-water pollutants have been decomposed by oxidation.

* * * * *